United States Patent
Van Der Zwan et al.

(10) Patent No.: US 11,536,648 B2
(45) Date of Patent: Dec. 27, 2022

(54) OPTICAL INSPECTION DEVICE AND METHOD

(71) Applicant: Nederlandse Organisatie voor toegepast-natuurwetenschappelijk onderzoek TNO, 's-Gravenhage (NL)

(72) Inventors: Bertram Adriaan Van Der Zwan, Dordrecht (NL); Sjoerd Oostrom, Alphen aan den Rijn (NL); Bart Gerardus Speet, Woubrugge (NL)

(73) Assignee: Nederlandse Organisatie voortoegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/258,674

(22) PCT Filed: Jul. 15, 2019

(86) PCT No.: PCT/NL2019/050446
§ 371 (c)(1),
(2) Date: Jan. 7, 2021

(87) PCT Pub. No.: WO2020/013699
PCT Pub. Date: Jan. 16, 2020

(65) Prior Publication Data
US 2021/0270727 A1    Sep. 2, 2021

(30) Foreign Application Priority Data
Jul. 13, 2018  (EP) ..................................... 18183504

(51) Int. Cl.
*G01N 21/31*    (2006.01)
*G01N 21/88*    (2006.01)
(Continued)

(52) U.S. Cl.
CPC ......... *G01N 21/31* (2013.01); *G01N 21/8806* (2013.01); *G01N 21/95* (2013.01);
(Continued)

(58) Field of Classification Search
CPC .... G01N 21/31; G01N 21/8806; G01N 21/95; G01N 2201/02; G01N 2201/0633; G02B 21/365
(Continued)

(56) References Cited

U.S. PATENT DOCUMENTS

2002/0088952 A1    7/2002  Rao et al.
2015/0285743 A1   10/2015  Tung et al.
(Continued)

FOREIGN PATENT DOCUMENTS

JP    62134647 A  *  6/1987    ............... G03F 1/84

OTHER PUBLICATIONS

European Patent Office, International Search Report in corresponding International Application No. PCT/NL2019/050446, dated Oct. 1, 2019 (3 pages).
(Continued)

*Primary Examiner* — Tarifur R Chowdhury
*Assistant Examiner* — Omar H Nixon
(74) *Attorney, Agent, or Firm* — Leydig, Voit & Mayer, Ltd.

(57) ABSTRACT

The optical inspection device is used for inspecting a planar object surface for the presence of particles and/or defects. A light source supplies light to the planar object surface of the object at a grazing angle. An image sensor receives light due to scattering from particles and defects on the object surface. The optical axis of the objective is at non-zero angles with the normal to the planar object surface and a direction or directions of specular reflection of the light from the light source by the planar object surface. A detection surface of
(Continued)

the image detection device and the optical axis of the objective is in a Scheimpflug configuration. The light source and image sensor are located outside a space extending perpendicularly from the planar object surface, on opposite sides of that space. The image sensor comprises an objective and an image detection device. The device may further comprise a microscope or spectrometer to access the object surface through said space.

17 Claims, 2 Drawing Sheets

(51) Int. Cl.
      *G01N 21/95*       (2006.01)
      *G02B 21/36*       (2006.01)

(52) U.S. Cl.
     CPC ....... *G02B 21/365* (2013.01); *G01N 2201/02* (2013.01); *G01N 2201/0633* (2013.01)

(58) Field of Classification Search
    USPC ......................................................... 356/327
    See application file for complete search history.

(56) References Cited

U.S. PATENT DOCUMENTS

| | | | |
|---|---|---|---|
| 2015/0293460 A1* | 10/2015 | Takehisa | G03F 1/84 |
| | | | 355/67 |
| 2017/0205704 A1* | 7/2017 | Nikipelov | G03F 1/24 |
| 2019/0094682 A1* | 3/2019 | Liu | G03F 1/62 |

OTHER PUBLICATIONS

Charalampos Bakolias et al., "Dark-field Scheimpflug imaging for surface inspection," Proceedings of SPIE, vol. 3029, pp. 57-68, XP055535904 (Apr. 15, 1997).

* cited by examiner

OPTICAL INSPECTION DEVICE AND METHOD

CROSS-REFERENCE TO RELATED APPLICATIONS

This patent application is a U.S. National Phase of PCT International Application No. PCT/NL2019/050446, filed Jul. 15, 2019, which claims priority to European Application No. 18183504.2, filed Jul. 13, 2018, which are both expressly incorporated by reference in their entireties, including any references contained therein.

FIELD OF THE INVENTION

The invention relates to an optical inspection device and method for detecting particles on a sample surface. In embodiments the sample is a photolithographic mask, reticle, Particle Measurement Card (PMC), or pellicle.

BACKGROUND

It is known to inspect a flat object surface for the presence of particles by observing the surface under a microscope while the surface is illuminated under a grazing angle. This produces a dark field image, wherein the only observed light is due to scattering of the grazing light from particles on the surface and/or other irregularities. If the particles are scarcely distributed, this makes it possible to spot individual particles even if the particles individually cannot be optically resolved.

Detailed particle inspection methods inspect only small areas, of for example 5×5 mm. Larger sample areas can be inspected by successively inspecting different sub-areas (stitching). This makes it time intensive to inspect samples of very large areas. Furthermore, it is difficult to use known particle methods in-line, for example because of dimensional limitations. The image sensor and its objective obstructs use of the sample for other purposes.

US2002088952 discloses optical inspection for detecting contaminant particles on the surface of electronic substrates such as semi-conductor wafers. In an embodiment with a camera above the substrate, the substrate is illuminated under grazing incidence, with light that has been passed through a polarization filter. The camera receives the light through a cross-polarized filter, to acquire images of the non-specularly reflected depolarized light that is scattered from particles and other defects and features on the surface of the substrate. Dependent on whether polarization filters are used, unpolarized light scattering; cross-polarized light scattering; and flourescence can be detected. Another embodiment is described wherein the camera is arranged in a Scheimpflug imaging mode, where the camera lens axis is not normal to the substrate plane.

An article titled "Dark-field Scheimpflug imaging for surface inspection" by Charalampos et al also describes inspection using Scheimpflug imaging in Proceedings SPIE 3029 pages 57-58 (EPO reference XP055535904). This article concerns the inspection of ceramic tiles for dents and scratches. Grazing incidence illumination is used to increase the ratio of specular versus diffuse reflection of non-specular tile surfaces.

SUMMARY

Among others, it is an object to increase sensitivity of inspection of an object surface for the presence of particles, and/or increase the speed of particle inspection and/or to make it easier to combine particle inspection with other access to the object surface.

Among others, it is an object to provide for inspection of a pellicle mounted above a photolithographic reticle.

A method of inspecting a planar object surface for the presence of particles and/or defects is provided, wherein the method comprises the steps of lighting the planar object surface under a grazing angle or range of grazing angles, from a light source located outside a space extending perpendicularly from the planar object surface;

imaging the planar object surface through an objective onto a detection surface of an image detection device, the optical axis of the objective being at non-zero angles with the normal to the planar object surface and a direction or directions of specular reflection of the light from the light source by the planar object surface, the detection surface and the optical axis of the objective being in a Scheimpflug configuration to focus the planar object surface onto the detection surface, the image detection device and the objective being located outside said space, said space being located between the objective and the light source.

By placing the image sensor on the side, a higher sensitivity to scattered light from particles and protruding defects on the object surface is realized than when the optical axis of the objective would be directed along the normal to the surface. In an embodiment, the angle between the optical axis of the objective and the normal to the planar object surface is at least thirty degrees. In an embodiment, the grazing angle is between one and fifteen degrees, for example between one and five degrees or between five and fifteen degrees.

Moreover the space extending perpendicularly from the entire surface of the object, i.e. the space bounded by a perpendicular extension of the circumferential edge of surface of the object under inspection, allows other use that accesses the object surface through this space. In one example, a microscope may be used to accesses the object surface through this space to make detailed images of defects, whereas the image sensor on the side is used to image the object surface in its entirety allowing only the pixel locations where particles are present to be determined. In another example, wherein object is a reticle for photolithography, the space may be used to transmit and/or receive a beam that is patterned by the reticle, concurrently allowing on-line inspection of the reticle by means of the objective.

Preferably, the entire object surface to be inspected is imaged onto the image detection device in one image. This ensures maximum speed of detection. Alternatively the entire object surface to be inspected may be imaged by means of a plurality of images of different parts of the surface, by moving the image sensor and the substrate surface relative to each other between capturing successive images. But to ensure high speed, the number of successive images is preferably kept small, e.g. less than ten or twenty images. The substrate may have a size of more than twenty millimeter wide and long.

In an embodiment, the planar object surface is lighted by the light source through a polarizer configured to light the planar object surface with TE polarization. This is advantageous for detection of particles on the object surface when the object surface is of a transparent material, e.g. if it is a pellicle of a reticle (i.e. mask) for photolithography. The polarization reduces the amount of light through the surface due to reflections or scattering below the surface, thus reducing noise due reflections from below the surface.

This is especially advantageous for inspection when the pellicle is mounted above a reflective or transmissive photolithographic reticle (i.e. a mask for visible light, UV light or EUV light), since the method can be used to reduce noise due to reflection from the mask during inspection of the pellicle.

In an embodiment the objective is a telecentric objective. This has the effect that pixels of the same size in the image detection device will detect light from areas of the same size on the object surface, independent of the distance of the area from the objective. The facilitates estimation of particle parameters from the captured image.

In an embodiment, a controller coupled to an output of the image detection device
  detects a pixel in a first image detected by the image detection device, where an intensity of the image at the pixel exceeds a predetermined threshold value;
  causes a positioning device to move a microscope to a position where the microscope forms a second image of a part of the planar object surface that contains an area of the planar object surface that the objective images onto said pixel, or to successive positions where the microscope successively forms second images that together contain said area, the second image or second images being formed with a greater magnification of the object surface than the first image;
  capture said second image or said second images from said microscope.

Thus, the time needed to obtain an image of a particle can be reduced. Instead of capturing images with the microscope until an image with a particle is obtained, an image obtained from the image sensor outside the space is effectively used to perform a coarse search. This can be combined with microscope imaging because the image sensor outside the space leaves room for the microscope to access the surface through that space. Instead of, or in addition to microscope imaging, spectrometry can be performed in the parts of the image.

According to another aspect an optical inspection device is provided for inspecting a planar object surface for the presence of particles and/or defects. The optical inspection device comprising
  an object location for placing an object;
  a light source configured to supply light to the planar object surface of the object, when placed at the object location, at a grazing angle or range of grazing angles, the light source being located outside a space extending perpendicularly from the planar object surface;
  an image sensor comprising an objective and an image detection device, the optical axis of the objective being at non-zero angles with the normal to the planar object surface and a direction or directions of specular reflection of the light from the light source by the planar object surface, a detection surface of the image detection device and the optical axis of the objective being in a Scheimpflug configuration to focus the planar object surface onto the detection surface, the image detection device and the objective being located outside said space, said space being located between the objective and the light source.

By placing the image sensor on the side, a higher sensitivity to scattered light from particles and protruding defects on the object surface is realized than when the optical axis of the objective would be directed along the normal to the surface. Moreover the space extending perpendicularly from the entire surface of the object, i.e. the space bounded by a perpendicular extension of the circumferential edge of surface of the object under inspection, allows other use that accesses the object surface through this space.

BRIEF DESCRIPTION OF THE DRAWING

These and other objects and advantageous aspects will become apparent from a description of exemplary embodiments with reference to the following figures

DETAILED DESCRIPTION OF EXEMPLARY EMBODIMENTS

Figure 1:
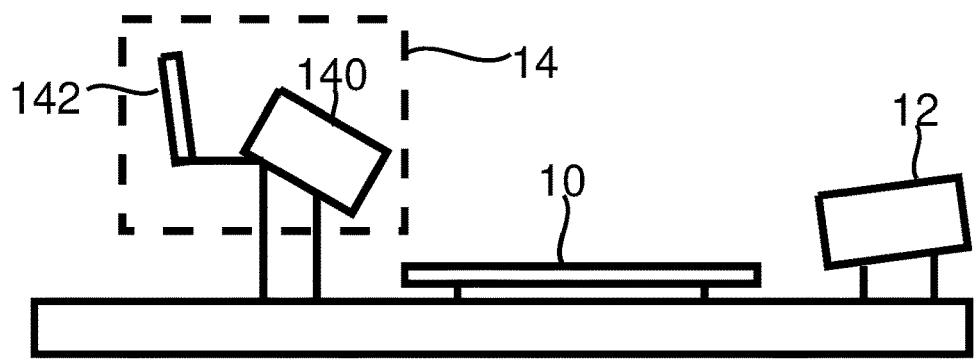
FIG. 1 shows an optical inspection device

FIG. 1 shows an optical inspection device for inspecting a planar surface 10 of an object for the presence of particles. The optical inspection device comprises an object location for placing the object, a light source 12, and an image sensor 14. The object location may comprise position guide elements, such as holes, protrusions, ridges, grooves or edges for accurately positioning objects of predetermined size at a predetermined position relative to light source 12 and image sensor 14. Light source 12 and image sensor 14 are located at a distance from the plane of object surface 10, on the same side of said plane, but on opposite sides of a space extending perpendicularly from the entire surface 10 of the object, i.e. a space bounded by a perpendicular extension of the circumferential edge of surface of the object under inspection. Furthermore, the optical inspection device may comprise a controller (not shown) coupled to an output of image sensor 14. The controller may comprise a (micro-) computer.

Light source 12 is configured to direct light at a grazing angle to object surface 10, for example along a direction or directions that make an angle of between one and fifteen degrees with the plane of object surface 10, for example between one and five degrees, or between five and fifteen degrees. In an embodiment, light source 12 comprises a linear light source, such as an array of LEDs, extending along a line in parallel with the object surface 10, located at a distance from the plane of object surface 10 so that the angles between any point on object surface 10 and lines from points along the linear light source lie within the range between one and fifteen degrees, for example between one and five degrees or between five and fifteen degrees.

In a further embodiment, light source 12 comprises a collimator, e.g. a cylindrical lens between the linear light source and the object surface 10, arranged to make the direction of incident light the same everywhere on the object surface 10. But this is not strictly necessary. In an embodiment a linearly scannable light source is used, with a light source such as a LED and scanning mechanism to scan the position of the light source along a line in parallel with the object surface 10, or to scan the position and/or orientation of a reflector to create a similar scanning effect. Instead of a LED another type of light source, such as a laser may be used in light source 12.

Image sensor 14 comprises an objective 140 and a detection device 142 with a pixel matrix for detecting light intensity at a plurality of pixel locations. Preferably, objective 140 and detection device 142 are in a Scheimpflug configuration, i.e. with the detection surface of detection device 142 at non-perpendicular incidence angle to the optical axis of objective 140, the incidence angle being selected so that the object surface 10 is in focus everywhere on the detection surface of detection device 142. The view angle between the optical axis of objective 140 and object surface 10 is selected to ensure dark field imaging, by avoiding imaging specular reflection of light from light source 12 via object surface 10, i.e. the optical axis of objective 140 is directed so that the view angle lies outside the range of angles of incidence of light source 12 on object surface 10. For example, the angle between the optical axis of objective 140 and the normal to the plane of surface 10 of the sample may lie in a range of thirty to eighty degrees, fore example between thirty to seventy degrees.

Although FIG. 1 illustrates an embodiment with direct transmission of the light in image sensor 14, it should be appreciated that image sensor 14 may comprise one or more reflectors, and that objective 140 could be implemented using a reflector, or a plurality of reflecting elements. In an embodiment, objective 140 is a telecentric objective 140, preferably a bi-telecentric objective. Use of a telecentric objective has the effect that equal sized pixel areas of detection device 142 correspond to equal sized object areas on object surface 10, irrespective of the location of the object area on object surface 10. For a bi-telecentric objective the size is also independent of the distance to the image plane.

Figure 2:
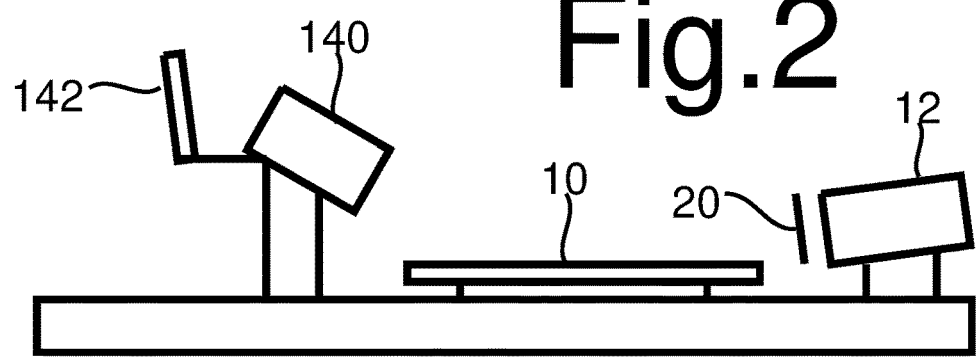
FIG. 2 shows an optical inspection device with an added polarizer

FIG. 2 shows an embodiment of the optical inspection device wherein a polarizer 20 has been added between light source 12 and sample surface 10. Polarizer 20 is intended for applications wherein the object surface is of optically transparent material. Polarizer 20 is configured to provide for S polarized light (TE polarized) on object surface 10, i.e. with the E field component of the light in parallel with the plane of object surface 10.

In operation, object surface 10 is lighted with grazing light from light source 12. In the embodiment of FIG. 2 this is done via polarizer 20. Object surface 10 specularly reflects the grazing light (i.e. with equal angles between object surface 10 and the incoming and reflected light). Furthermore particles or defects on planar object surface 10, if present, give rise to light in other directions. This can be direct light from the particles or defects or indirect light from the particles or protruding defects reflected via the object surface.

Image sensor 14 detects light from the particles or defects. Placing image sensor 14 outside the space extending perpendicularly from the entire surface 10 of the object, e.g. so that the imaging angle between the optical axis and the normal to the object surface 10 is more than thirty degrees (e.g. forty five or sixty degrees), has the advantage that Image sensor 14 is capable of capturing indirect reflections. Reflection intensity from particles and protruding defects is stronger in such directions than in the direction along the normal to object surface 10.

The substrate may have a size of more than twenty millimeter wide and long. Preferably, the entire object surface to be inspected is imaged onto the image detection device 142 in one image. This ensures maximum speed of detection. Alternatively the entire object surface to be inspected may be imaged by means of a plurality of images of different parts of the surface, by moving the image sensor and the substrate surface relative to each other between capturing successive images. But to ensure high speed, the number of successive images is preferably kept small, e.g. less than ten or twenty images. With practical image sensors of no more than a few thousand pixels wide and long. This means that relevant particles of a few micron map to less than the pixel size.

In one application object surface 10 may be of an optically transparent material. For example, object surface 10 may be the surface of a pellicle on a reticle (i.e. mask) for photolithography. Optical detection of particles or defects on an optically transparent material is difficult because of stray light from reflections from below the object surface 10. By using polarizer 20, light transmission to reflectors or scatterers below the object surface 10 is reduced, thereby reducing stray light, which otherwise would reduce the contrast of light in the detection system to a level that makes particle detection impossible. Use of grazing incidence also reduces such transmission. In an alternative embodiment wherein polarizer 20 is used, image sensor 14 may be located perpendicularly above object surface 10, in which case no Scheimpflug configuration is needed. This alternative embodiment can be used to detect particles and defects on a transparent object surface 10 with reduced noise due to light scattered from below transparent object surface 10, e.g. from below a pellicle on a reticle of a photolithographic mask.

In an embodiment of the device of FIG. 2, polarizer 20 may be adjustable or removable to enable imaging of particles below the surface as well. In this embodiment, the device may comprise a computer programmed to capture a further image from detection device 142 without polarizer 20 and/or with a different polarization directions and subtract the image obtained with polarizer 20 from the further image to obtain a difference image with relatively more reflection or scattering intensity from below a transparent object surface 10. In this embodiment, the location of image sensor outside the space perpendicularly above object surface 10 makes it possible to detect particles or defects on the underside of a thin transparent layer such as a pellicle.

Figure 2A:
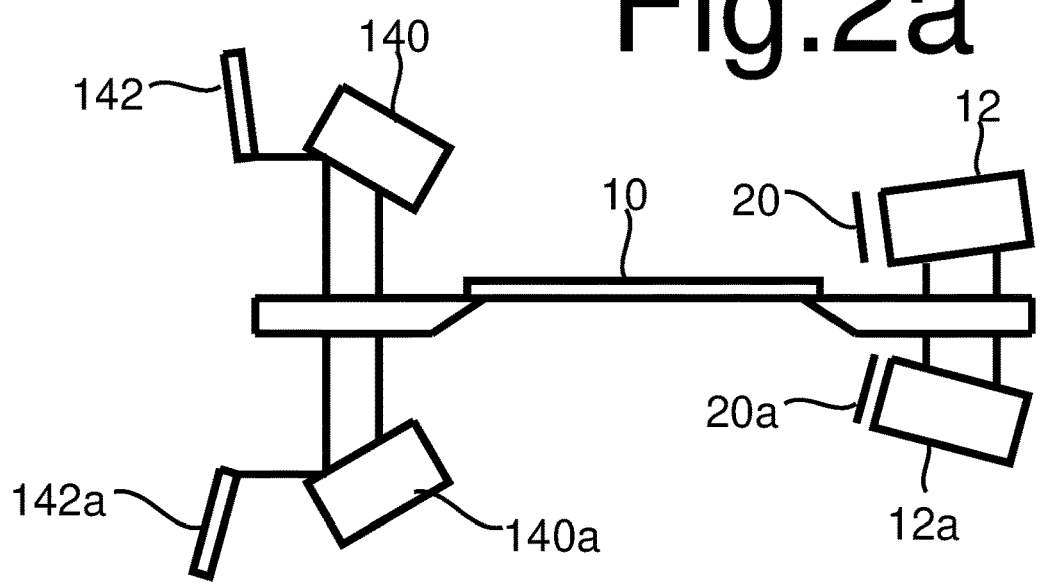
FIG. 2a shows a device for two-sided optical inspection

FIG. 2a shows a device for two-sided optical inspection. Compared to FIG. 2, a further light source 12a, a further polarizer 20a, a further objective 140a and a further detection device 142a have been added below the plane wherein the object is positioned, in a similar configuration as light source 12, polarizer 20, objective 140 and detection device 142. Further objective 140a and further detection device 142a are positioned so that light from light source 12 that is passed through the object without scattering is not imaged on detection device 142a. Similarly, further light source 12a is positioned so that so that light that is passed from further light source 12a through the object without scattering is not imaged on detection device 142.

The device of FIG. 2a can be used to perform the same inspection as the device of FIG. 2 both from above and from below the object. In addition, the device of FIG. 2a can be used to detect light that has been transmitted through the object, by using detection device 142 to detect scattering of light from further light source 12a when light source 12 is turned off and/or by using further detection device 142a to detect scattering of light from light source 12 when further light source 12a is turned off.

This has the advantage that different types of defects can be distinguished. For example, a pellicle for use in photolithography may have particles on its upper or lower surface as well as holes through the pellicle. Particles on the upper or lower surface make the pellicle unsuitable for photolithographic use, since they cause shading. In contrast, small holes need not make the pellicle unsuitable for photolithographic use.

However, a particle on the upper surface and a hole through the pellicle may be indistinguishable from measurement obtained with only light source 12 and detection device 142 above the pellicle. By combining such measurements with measurements involving further light source 12*a* and/or further detection device 142*a*, particles can be distinguished form holes.

A method of inspection a transparent layer such as a pellicle may be used, wherein at least four images are captured. In this method a first and second image are captured with a first detection device 142 on a first side of the plane, in which the layer lies. A third and fourth image are captured with a second detection device 142*a* on a second side of this plane, opposite the first side, so that the plane is between the first and second detection device 142, 142*a*.

First and second detection device 142, 142*a* may be aligned in the sense that corresponding positions on the layer are imaged the same image positions in the images detected by first and second detection device 142, 142*a*. If need be the first and second image may be registered with the third and fourth image, to ensure that corresponding positions on the layer are imaged the same pixel positions.

Registration may comprise mapping one or both images using one or more mapping functions, with transformation parameter values that provide for registration. The parameter values may be determined for example from measured positions of edges of a frame that holds the layer (e.g. pellicle) obtained using the first and second detection device 142, 142*a* or the measured positions of alignment marks on the layer or frame. Optionally, the parameters may be determined using the locations of corresponding detections, in the different images, of the same features (e.g. holes) on the layer. Instead of image mapping, the measured coordinates of image features such as holes in the layer may be transformed using such transformation parameter values after detection of the coordinated from the images.

The first and third image are captured while a first light source 12 on the first side of the plane is on. The second and fourth image are captured while a second light source 12*a* on the second side of the plane is on. The use of the four images makes it possible to distinguish particles on the different sides of the layer and holes. Generally, a particle produces the strongest light detection in images obtained with a light source 12, 12*a* and a detection device 142, 142*a* on the same side of the layer as the particle (e.g. first or fourth image). A hole also produces detection in these images, but also in images produced with a light source 12, 12*a* and a detection device 142, 142*a* on opposite sides of the layer. Therefore, it can be distinguished whether scattering at a position is due to a particle or a hole, by testing whether or not more than a threshold amount of transmitted light is detected at the same position.

A computer may be programmed with a program to control activations of the light sources 12, 12*a* and capture of the first to fourth images. The program performs detection of positions where more than a first threshold amount of scattered or reflected light is detected in the first or third image. The program performs tests whether such a position corresponds to a particle or hole, by testing whether the detection of transmitted light is above or below a second threshold. The second threshold may be selected in proportion to the detected scattering or reflection intensity or, equivalently the ratio of the intensities may be compared with a threshold.

For capturing each of the first to fourth images an optimized image polarization direction may be selected. For example S-polarization, or TE polarization for capturing scattering (the first and fourth image) and P polarization (TM) for capturing transmission (the second and third image). Instead of four image with different light source 12, 12*a* and detection device 142, 142*a* combinations, one or more of the same combinations may be used to capture images using different polarizations. Holes tend to produce more scattering with P polarization than particles and this can be used to distinguish positions of S polarized scattering or reflection due to holes and particles.

In an embodiment, the layer (e.g. pellicle) may be rotated around an axis perpendicular to its surface and images may be captured at different rotations, e.g. ninety degree rotations. This makes it possible to detect more particles and/or distinguish more properties of the particles at the same position on the layer.

In prior art inspection applications wherein a large object surface has to be inspected for much smaller particles, inspection can be very time consuming, e.g. an hour or more for a large surface. The inspection time can be reduced by imaging the entire surface of the object at once, or in a limited number of steps. In the configuration wherein the imaging angle between the optical axis of objective 140 and the normal to the object surface 10 is significantly different from zero, this is made possible by using the Scheimpflug configuration.

The entire surface of the object may be imaged at once, or in a limited number of steps, so that the size of the areas on object surface 10 that map to pixels of detection device 142 will be much larger than the size of the detected particles or defects. For example, the diameter of the particles may be in the order of a few microns and the areas on object surface 10 that map to pixels of detection device 142 may be tens to hundreds of microns in diameter. Such an inspection still makes it possible to detect particles. As long as a particle or defect lies in such an area, it will give rise to light intensity on the corresponding pixel.

When the surface density of particles or defects is so small that most of these areas contain no more than one particle or defect, the detected light intensity can be used as a measure of particle of defect size. However, if the sizes of the areas on object surface 10 that map to pixels of detection device 142 differ, it may be difficult to perform such measurements. This may be the case when the imaging angle between the optical axis of objective 140 and the normal to the object surface 10 is significantly different from zero. In this case, some areas may be so large that there is a significant probability that they contain more than one particle or defect. Furthermore, additional computations may be needed to calibrate the measure of particle of defect size.

This is avoided in the embodiment wherein objective 140 is a telecentric objective, preferably a bi-telecentric objective. A telecentric objective 140 maps the same size object areas to pixel areas in the image plane independent of object distance. This is the case when the object plane and image surface are perpendicular to the optical axis of the (bi-)telecentric objective. When a combination of a (bi-)telecentric objective and a Scheimpflug configuration is used, this is so for the object surface 10 that is not perpendicular to the optical axis of the (bi-)telecentric objective 140. As a result, pixel areas on detection device 142 correspond to equal size object areas on object surface 10, so that the probability that a defect will be detected in different pixel areas of the same size is the same for all pixel areas.

The use of a light source 12 and image sensor 14 on opposite sides of a space extending perpendicularly from the entire surface 10 of the object makes it possible to combine particle detection with other use of the object by means of devices that access the object surface through said space.

Figure 3:
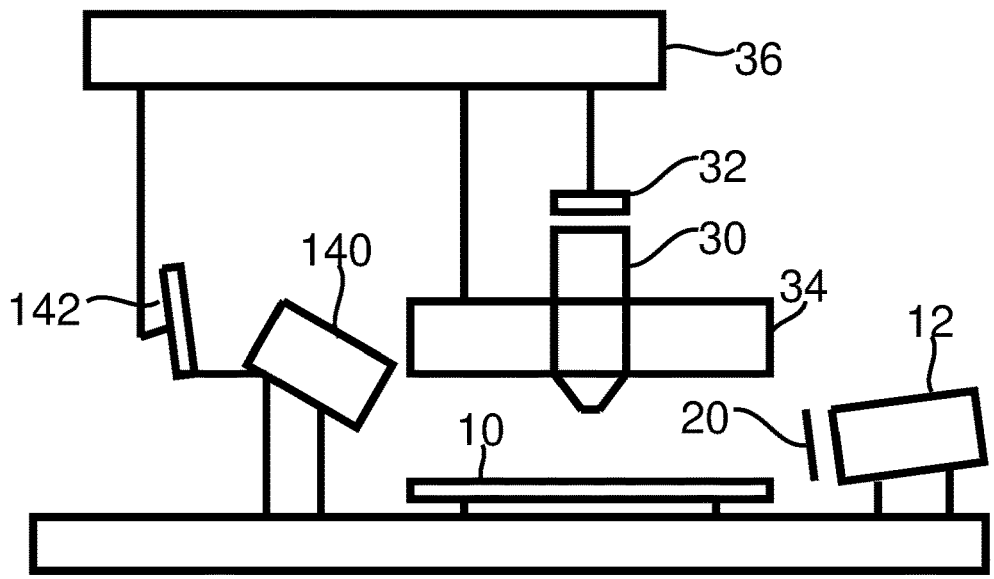
FIG. 3 shows an optical inspection device with a microscope

FIG. 3 shows an embodiment of an optical inspection device that contains a microscope 30 with a further image sensor 32 and a positioning system 34 in the space extending perpendicularly from the entire object surface 10, and a controller 36 coupled to image detection device 142, positioning system 34, and further image sensor 32. As shown, this embodiment preferably contains polarizer 20, but this is not always necessary. Controller 36 may comprise a programmable computer and a program of instructions to make the computer perform the operations that controller 36 is configured to perform.

Controller 36 is configured to read image data from image detection device 142. As described, this image data will show increased detected light intensity in pixel areas that correspond to areas on object surface 10 wherein a particle or defect is present.

Figure 4:
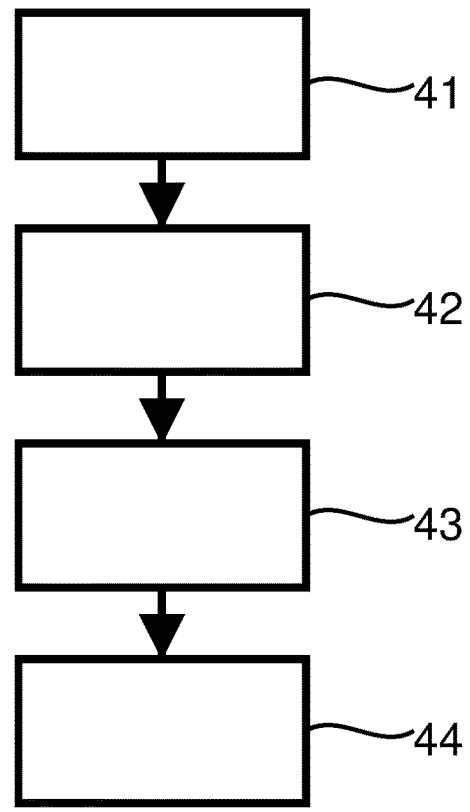
FIG. 4 shows a flow-chart of an inspection process

Controller 36 is configured to perform a process as shown in FIG. 4. In a first step 41, controller 36 reads a first image from image data from image detection device 142. In a second step 42 controller 36 selects a pixel from the first image wherein the intensity exceeds a predetermined threshold. The threshold may be manually adjustable for application to all pixels of the first image for example, and/or it may preset to an intensity corresponding to a predetermined size of particle. The selection of the pixel selection defines an area on object surface 10, which objective 140 maps to the selected pixel. In a third step 43 controller 36 controls positioning system 34 to move microscope 30 to a location where microscope 30 images a part of object surface 10 that contains the area which maps to the selected pixel. Microscope 30 is moved laterally, i.e. in a direction or directions parallel relative to the plane of object surface 10 and optionally also transversely to reduce the distance between microscope 30 and object surface 10. In a fourth step 44 controller 36 reads and stores a second image from further image sensor 32, where microscope 30 forms the second image of this part of object surface 10. Controller 36 may be configured to repeat this process from second step 42, successively selecting different pixels from the first image wherein the intensity exceeds a threshold, and performing third and fourth step 43 and, 44 for each of these pixels.

In an another embodiment, second step 42 may be replaced by a step wherein controller 36 receives a user selection of the pixel, or by a step wherein controller 36 receives a user selection of a multi pixel region containing said pixel and controller 36 selects the pixel from said region, by searching in set user selected region for a pixel with and intensity that exceeds the predetermined threshold.

The part of object surface 10 that is imaged in the second image may have the same size as the area which maps to the selected pixel or be larger by a fraction of the size of that area (e.g. it may have up to twice the size of the area), so that it is ensured that the particle or defect lies in the part of object surface 10 that is imaged by microscope 30. Because this part of object surface 10 is much smaller than the entire object surface 10, microscope 30 may provide for a much larger magnification than objective 140, enabling the formation of an image of the particle or defect by further image sensor 32. Thus images of the particle or defects can be obtained at much faster speed than by merely scanning microscope 30 to capture images of all possible parts of object surface.

In an alternative embodiment of third step 43 controller 36 may control positioning system 34 to move a microscope 30 to a plurality of successive locations where a microscope 30 successively images sub-part of the part of object surface 10 that, all together, cover the entire part, and controller 36 may be configured to capture images at these successive locations and select one of these images based on whether the image shows more than a threshold intensity. This makes it possible to use a greater magnification. This will take more time than imaging the entire part of object surface 10 at once, but still much less than imaging the entire object surface at the same magnification.

Although an embodiment has been shown wherein the microscope 30 and a positioning system 34 are located in the space extending perpendicularly from the entire object surface 10, it may be noted that they may also be located partly or wholly next to that space, outside that space. In both cases the position of light source 12 and image sensor 14 enables microscope 30 to access object surface 10, i.e. obtain an image of object surface 10.

In an embodiment, a spectrometer system may be used instead of, or in addition to, microscope 30 so that a spectrum of light in the selected part of the object surface is captured. In this embodiment, controller 36 reads and stores the spectrum in a fourth step 44. The spectrum may be used to characterize the particle or defect. The spectrometer system may comprise a fiber spectrometer with a fiber to guide captured light, wherein the tip of the fiber forms an aperture for capturing the light of which the spectrometer system determines the spectrum. In this case the positioning system moves the tip of the fiber to a position selected based on the pixel selection in second step 42. Alternatively, a microscope objective may be used to capture the light from the aperture of the microscope objective. In this case the positioning system moves the microscope objective. The microscope objective need not necessarily be used to form a microscope image in this case. Optionally both microscope imaging and spectrometry may be performed in combination.

As in the method of FIG. 4, an alternative embodiment of third step 43 is that controller 36 controls positioning system 34 to move the spectrometer and/or the microscope objective to a plurality of successive locations where the objective successively captures light from sub-part of the part of object surface 10 that, all together, cover the entire part, and controller 36 may be configured select a position where an intensity of the captured light or its spectrum exceeds a further threshold Instead of microscope 30 another device that makes use of the object may access the object through the space extending perpendicularly from the entire object surface 10. For example such an other device may be a beam source used to project a light beam through the object, or to create a beam that is reflected by the object, e.g. for performing photolithography using a pattern defined by the object, through the space extending perpendicularly from the object surface 10. Similarly, a target of a patterned beam (or a carrier for such a target) may be located so that it receives a patterned beam through this space. In this way, the optical inspection device enables in-line inspection of object surface 10 for the advent of particles during use.

Embodiments have been shown wherein light source 12 and image sensor 14 are arranged with the optical axis of objective 140 in a plane parallel to the normal to object surface 10 and the direction of incoming light. However, it should be noted that image sensor 14 may be positioned with the optical axis at a non-zero angle to said plane. As used herein, light source 12 and image sensor 14 are considered to be on opposite sides of the space extending perpendicularly from object surface 10 when the (optical axis) direction from image sensor 14 to object surface 10 is in a semi-circle opposite to the (optical axis) direction from light source 12 to object surface 10, i.e. between plus and minus ninety degrees when the latter direction is assumed to be at a hundred and eighty degrees. Preferably, image sensor at an angle in a range between plus and minus sixty degrees is used. In an embodiment the system may comprise a plurality of image sensors as described, at mutually different angles.

The invention claimed is:

1. A method of inspecting a pellicle mounted above a photolithographic reticle for presence of particles and/or defects, the method comprising:
   lighting a top surface of the pellicle, under a grazing angle or range of grazing angles through a polarizer configured to light the top surface of the pellicle with transverse-electric (TE) polarization, from a light source located outside a space extending perpendicularly from the top surface of the pellicle;
   imaging the top surface of the pellicle through an objective onto a detection surface of an image detection device,
   wherein an optical axis of the objective is at non-zero angles with respect to normal to the top surface of the pellicle and at a direction or directions of specular reflection of the light from the light source by the top surface of the pellicle,
   wherein the detection surface and the optical axis of the objective are in a Scheimpflug configuration to focus the top surface of the pellicle onto the detection surface,
   wherein the image detection device and the objective are located outside said space, and
   wherein said space is located between the objective and the light source.

2. The method according to claim 1, wherein the objective is a telecentric objective.

3. The method according to claim 1, wherein a controller coupled to an output of the image detection device:
   detects a pixel in a first image detected by the image detection device, where an intensity of the image at the pixel exceeds a predetermined threshold value;
   causes a positioning device to move a microscope to a position where the microscope forms a second image of a part of the top surface of the pellicle that contains an area of the top surface of the pellicle that the objective images onto said pixel, or to successive positions where the microscope successively forms second images that together contain said area, the second image or second images being formed with a greater magnification of the object surface than the first image; and
   captures said second image or said second images from said microscope.

4. The method according to claim 3, wherein the first image images the object surface in its entirety and the second image or images image over less than twice the size of said area of the top surface of the pellicle that the objective images onto said pixel.

5. The method according to claim 1, wherein a controller coupled to an output of the image detection device:
   detects a pixel in a first image detected by the image detection device, where an intensity of the image at the pixel exceeds a predetermined threshold value;
   causes a positioning device to move an aperture of a spectrometer system to a position where the spectrometer system captures light from a part of the top surface of the pellicle that contains an area of the top surface of the pellicle that the objective images onto said pixel, or to successive positions where the spectrometer system successively captures light from sub-areas that together contain said area; and
   reads a spectrum from the spectrometer system.

6. The method according to claim 1, wherein the angle between the optical axis of the objective and the normal to the top surface of the pellicle is at least thirty degrees.

7. The method according to claim 1, wherein the object is a transparent planar layer, and
   wherein the method comprises lighting and imaging with a further light source and/or a further image detection device on an opposite side of a plane within which the layer lies.

8. The method according to claim 1, wherein the lighting and imaging are performed, for a plurality of different orientations of the object relative to the light source and the image detection device, around a rotation axis perpendicular to the top surface of the pellicle.

9. An optical inspection device for inspecting a pellicle mounted above a photolithographic reticle for presence of particles and/or defects, the optical inspection device comprising:
   an object location, with the photolithographic reticle placed on the object location, wherein the pellicle is mounted above the photolithographic reticle for placing an object;
   a light source configured to supply light to the top surface of the pellicle, at a grazing angle or range of grazing angles, the light source being located outside a space extending perpendicularly from the top surface of the pellicle;
   a polarizer, positioned between the light source and the top surface of the pellicle, that is configured to light the top surface of the pellicle with transverse-electric (TE) polarization; and
   an image sensor comprising an objective and an image detection device,
   wherein an optical axis of the objective is at non-zero angles with respect to normal to the top surface of the pellicle and at a direction or directions of specular reflection of the light from the light source by the top surface of the pellicle,
   wherein a detection surface of the image detection device and the optical axis of the objective are in a Scheimpflug configuration to focus the top surface of the pellicle onto the detection surface,
   wherein the image detection device and the objective are located outside said space, and
   wherein said space is located between the objective and the light source.

10. The optical inspection device according to claim 9, wherein the objective is a telecentric objective.

11. The optical inspection device according to claim 9, wherein the light source comprises a collimator.

12. The optical inspection device according to claim 9, comprising:
   a microscope comprising a further image detection device, located to capture images formed by the microscope, the microscope being configured to capture images of parts of the object surface with a greater magnification of the object surface than the image sensor;
   a positioning system coupled to the microscope, configured to move the microscope relative to the object surface;
   a controller coupled to the image detection device, the further image detection device and the positioning device, wherein the controller comprises a program of instructions for the controller that, when executed by the controller, cause the controller to:

read a first image from the image detection device;

select a pixel in the first image wherein the intensity exceeds a predetermined threshold;

control the positioning system dependent on the pixel that has been selected, to move the microscope to a position where the microscope images a part of object surface that contains an area which maps to the selected pixel or to successive positions where the microscope successively forms second images that together contain said area; and read and store an image of said part of object surface from the further image sensor.

13. The optical inspection device according to claim 12, wherein the first image images the object surface entirely and the second images image over less than twice the size of said area.

14. The optical inspection device according to claim 9, comprising:

a spectrometer system, having an aperture for capturing light for spectrometry;

a positioning system coupled to the spectrometer system, configured to move the aperture relative to the object surface;

a controller coupled to the image detection device, the spectrometer system and the positioning device, the controller comprising a program of instructions for the controller, which when executed by the controller causes the controller to:

read a first image from the image detection device;

select a pixel in the first image wherein the intensity exceeds a predetermined threshold;

control the positioning system to move the aperture dependent on the pixel that has been selected, to a position where the aperture captures light from a part of object surface that contains the area which maps to the selected pixel or to successive positions where the aperture successively captures light from sub-areas that together contain said area; and read and store a spectrum of light obtained by the spectrometer system.

15. The optical inspection device according to claim 9, wherein the angle between the optical axis of the objective and the normal to the top surface of the pellicle is at least thirty degrees.

16. The optical inspection device according to claim 9, comprising a further light source and/or a further image detection device on an opposite side of a plane within which the top surface of the pellicle lies.

17. The optical inspection device according to claim 9, wherein the object location is rotatable relative to the light source and the image detection device, around a rotation axis perpendicular to the top surface of the pellicle.

* * * * *